(12) United States Patent
Hulvey

(10) Patent No.: US 8,170,485 B2
(45) Date of Patent: *May 1, 2012

(54) SYSTEM AND METHOD FOR USING A SINGLE ANTENNA FOR ACTIVE AND PASSIVE RADIO FUNCTIONS

(75) Inventor: Robert William Hulvey, Redondo Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/167,513

(22) Filed: Jun. 23, 2011

(65) Prior Publication Data

US 2011/0250841 A1 Oct. 13, 2011

Related U.S. Application Data

(63) Continuation of application No. 11/959,543, filed on Dec. 19, 2007, now Pat. No. 7,979,026.

(60) Provisional application No. 60/875,546, filed on Dec. 19, 2006.

(51) Int. Cl.
*H04B 7/00* (2006.01)

(52) U.S. Cl. ...... 455/41.2; 455/39; 455/41.1; 340/572.7
(58) Field of Classification Search ............ 455/39, 455/41.1, 41.2; 340/572.7
See application file for complete search history.

(56) References Cited

U.S. PATENT DOCUMENTS

| 7,050,775 | B2 * | 5/2006 | Mayor et al. | 455/258 |
|---|---|---|---|---|
| 7,215,297 | B2 | 5/2007 | Gothard et al. | |
| 7,586,855 | B1 * | 9/2009 | Yellai et al. | 370/255 |
| 2005/0057669 | A1 * | 3/2005 | Wakefield | 348/239 |
| 2005/0079817 | A1 * | 4/2005 | Kotola et al. | 455/41.2 |
| 2006/0281435 | A1 * | 12/2006 | Shearer et al. | 455/343.1 |
| 2007/0040760 | A1 * | 2/2007 | Nagaev et al. | 343/876 |

* cited by examiner

*Primary Examiner* — Tuan H Nguyen
(74) *Attorney, Agent, or Firm* — Duane S. Kobayashi

(57) ABSTRACT

A system and method for using a single antenna for active and passive radio functions. A wireless communication device includes a passive component that can be read using an antenna when the wireless communication device is in a low power sleep mode. When it is determined that a higher capacity is needed, the wireless communication device activates an active component. Activation of the active component includes a switching of a connection of the antenna from the passive component to the active component.

20 Claims, 2 Drawing Sheets

SYSTEM AND METHOD FOR USING A SINGLE ANTENNA FOR ACTIVE AND PASSIVE RADIO FUNCTIONS

This application is a continuation of non-provisional application Ser. No. 11/959,543, filed Dec. 19, 2007, which claims priority to provisional application No. 60/875,546, filed Dec. 19, 2006. Each of the above-identified applications is incorporated by reference herein, in its entirety, for all purposes.

BACKGROUND

1. Field of the Invention

The present invention relates generally to antenna systems and, more particularly, to a system and method for using a single antenna for active and passive radio functions.

2. Introduction

Portable wireless devices continue to proliferate in today's technology-driven market. Advances in computing technology and manufacturing processes have resulted in a dramatic lowering of the costs of such devices. For passive radio systems such as the radio frequency identification (RFID) system, it is now typical that the antenna is one of the most expensive components.

In general, RFID tags can transmit data such as identification information, location information, or information about the tagged product (e.g., price, color, date of purchase, etc.) to a tag reader. RFID tags have therefore proved useful in various tracking and access applications. Passive RFID tags require no internal power source because the minute electrical current induced in the antenna by the incoming RF signal provides enough power for the RFID tag circuitry to power up and transmit a response.

It is often desirable to include passive RFID tags in equipment that would normally be powered from an active power source such as a battery, electrical mains, or solar cells. The passive RFID tags can provide location, identification, or other information about the device during times when the active power source is not available such as during manufacturing, assembly, packaging, shipping, etc. As use of RFID technology continues to expand in the marketplace, a cost-effective mechanism is needed to integrate the technology in active devices.

SUMMARY

A system and/or method for using a single antenna for both active and passive radio functions, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
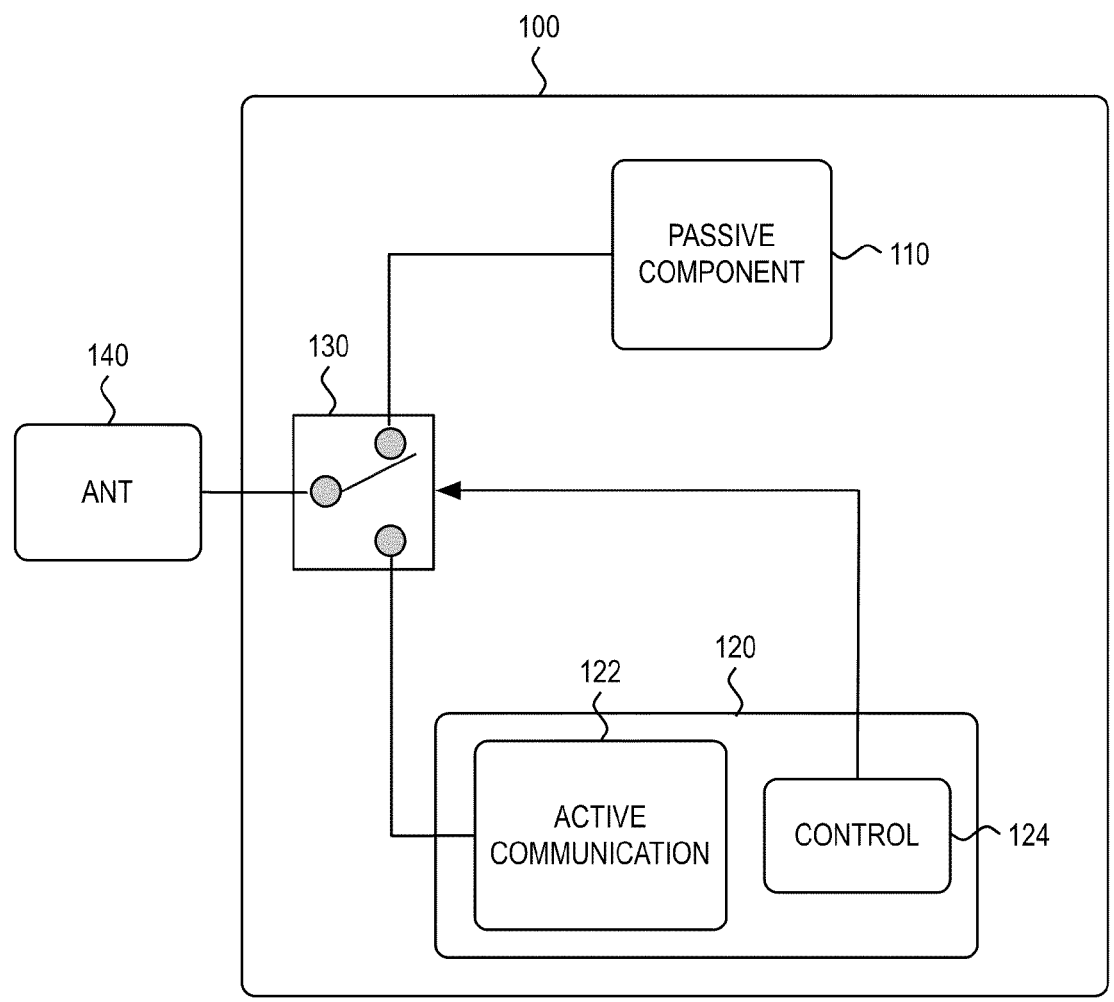
FIG. 1 illustrates an embodiment of a device that incorporates both active and passive components.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

RFID tags provide a flexible communication mechanism by which information can be read from a memory using a portable reader device. This communication mechanism typically does not consume significant amounts of power. This is especially true in those situations where the RFID tag is a passive device.

RFID tags can be integrated in various portable devices. For example, an RFID tag can be incorporated into a personal digital assistant or mobile phone for use in an electronic commerce application. In this application, the RFID tag memory can store financial information that can be read by an RFID reader at a point of sale. RFID tags can also be integrated in portable devices that are designed to operate in a short-range wireless application (e.g., Bluetooth, Wi-Fi, etc.).

In general, the combination of a passive device and active-only devices, such as short-range wireless devices, enables distinct operating modes by the combined device. A first operating mode can be based on the passive component (e.g., passive RFID), while a second operating mode can be based on the active-only component (e.g., Bluetooth). Through the integration of the passive component along with the active-only component into a single device, new uses of such a device are enabled.

In one example, the passive component, by its very nature, would be designed to operate independently of the active-only component. Thus, for example, a passive RFID component in a mobile phone could be read by a tag reader without having the mobile phone turned on.

In another example, a read of the passive RFID component can be used as part of a configuration process prior to the subsequent activation of the active-only part of the host device. The active-only device could therefore remain in a low power sleep mode until one or more functions of the active-only part of the host device are required. This serves to reduce the overall power requirement at the host device.

In one example, the host device is a Bluetooth mouse, keyboard or headset that incorporates a passive RFID tag containing configuration information. This configuration information can be stored in non-volatile memory (e.g., EPROM, Flash, etc.) that is fixed at a factory or other distribution point. In this example, a read of the passive RFID tag could occur when a user desires to pair the device to a PC or mobile phone. Upon the read of the passive RFID tag, the microcontroller in the Bluetooth device would then awaken to control the Bluetooth pairing process. Here, the microcontroller would remain in the low power state until a pairing process is actually initiated.

In another example, the host device is a mobile phone (or personal digital assistant) that stores information used for mobile payments (e.g., electronic wallet or credit-card). With a passive RFID tag, the host device may even be turned off when it is presented to a mobile payments terminal. After the mobile payments terminal reads the passive RFID tag, the mobile phone can then be activated to assist in the payments transaction. For example, the mobile phone can be configured to display a user interface that would enable the user to select the proper credit card to use.

In yet another example, the RFID tag can be incorporated into a "smart poster" that is designed for any public user to access. Since the RFID tag typically has limited capacity, and limited data rates, the RFID tag can be used to facilitate a subsequent higher-speed connection between the user device and the "smart poster." For example, after a user device (e.g., mobile phone) reads the passive RFID tag, another device having a higher speed connection (e.g., Bluetooth or Wi-Fi), and also higher storage capability would then awaken. Here, the initial read of the RFID tag could possibly enable the transfer of configuration information, while the higher speed connection would enable the transfer of the media information (e.g., text, audio, and video) relating to the subject being advertised.

As has been described, there can be significant value in integrating a passive component into a device having existing active-only components. This integration can come at significant cost, however, since such a combined device would support multiple antennas (one for the passive component and one for the active-only component). Indeed, as noted above, a significant amount of the cost of a passive component is the cost of the antenna. In addition, the integration of such devices comes would require additional space, which is detrimental to the design of small, portable devices.

It is therefore a feature of the present invention that the passive device technology can be integrated into an active-only device with little added cost or complexity. FIG. 1 illustrates one embodiment of such integration that adds little cost or complexity. As illustrated, device 100 includes active component 120, which contains active communication element 122 and control element 124. In one example, active component 120 can represent a Bluetooth radio module. In another example, active component 120 can represent a Wi-Fi module. Active component 120 communicates using antenna 140. In one embodiment, antenna 140 is a dipole antenna that enables communication in the 900 Mhz or 2.4 Ghz band. As would be appreciated, the principles of the present invention would not be dependent on a particular antenna design.

For device 100, which includes active component 120, it is desired to include a passive component without adding cost or complexity. As illustrated in FIG. 1, device 100 also includes passive component 110 that can also be connected to antenna 140. In one example, passive component 110 can represent a passive RFID tag. In minimizing the cost of integrating passive component 110 into device 100, passive component 110 is designed to leverage an existing antenna that is also used by active component 120. To facilitate such a dual-use antenna scenario, device 100 includes switch 130.

In general, switch 130 is designed to couple antenna 140 to either active component 120 or passive component 110 depending on an operating mode of device 100. In one embodiment, a first operating mode can be used to represent those periods when active component 120 is capable of being used, while a second operating mode can be used to represent those periods when passive component 110 is capable of being used. For example, the first operating mode can be used when Wi-Fi communication is enabled, while the second operating mode can be used when Wi-Fi communication is not enabled. In another embodiment, switch 130 may be controlled by active component 120, for example by a firmware or software running on a processor within active component 120.

In one embodiment, switch 130 is an active switch. In another embodiment, switch 130 can be a network with variable impedances that can be changed according to which component is to be used at any given time.

In one embodiment, switch 130 can be designed such that it functions only when power is available. When the system is in a low-power "sleep" mode, a bias voltage or very small bias current from the power supply (not shown) would keep switch 130 in a state where passive component 110 is operably connected to antenna 140. In a powered mode (i.e., not sleeping), switch 130 can be controlled by control element 124 or similar control means to select between active component 120 or passive component 110 as desired.

In one embodiment, active component 120 and passive component 110 are implemented on a single-chip with an external antenna. In another embodiment, active component 120 and passive component 110 are embodied in separate chips, but are connected to the same antenna 140 using switch 130. In one embodiment, antenna 140 is integrated into the packaging of the single-chip, or any of the individual chips in a multi-chip solution.

The integration of passive component 110 into device 100 enables device 100 to function even when device 100 is in a low power "sleep" mode. For example, passive component 110 can be used when power is not available to perform functions such as identification, payment, configuration, etc.

Figure 2:
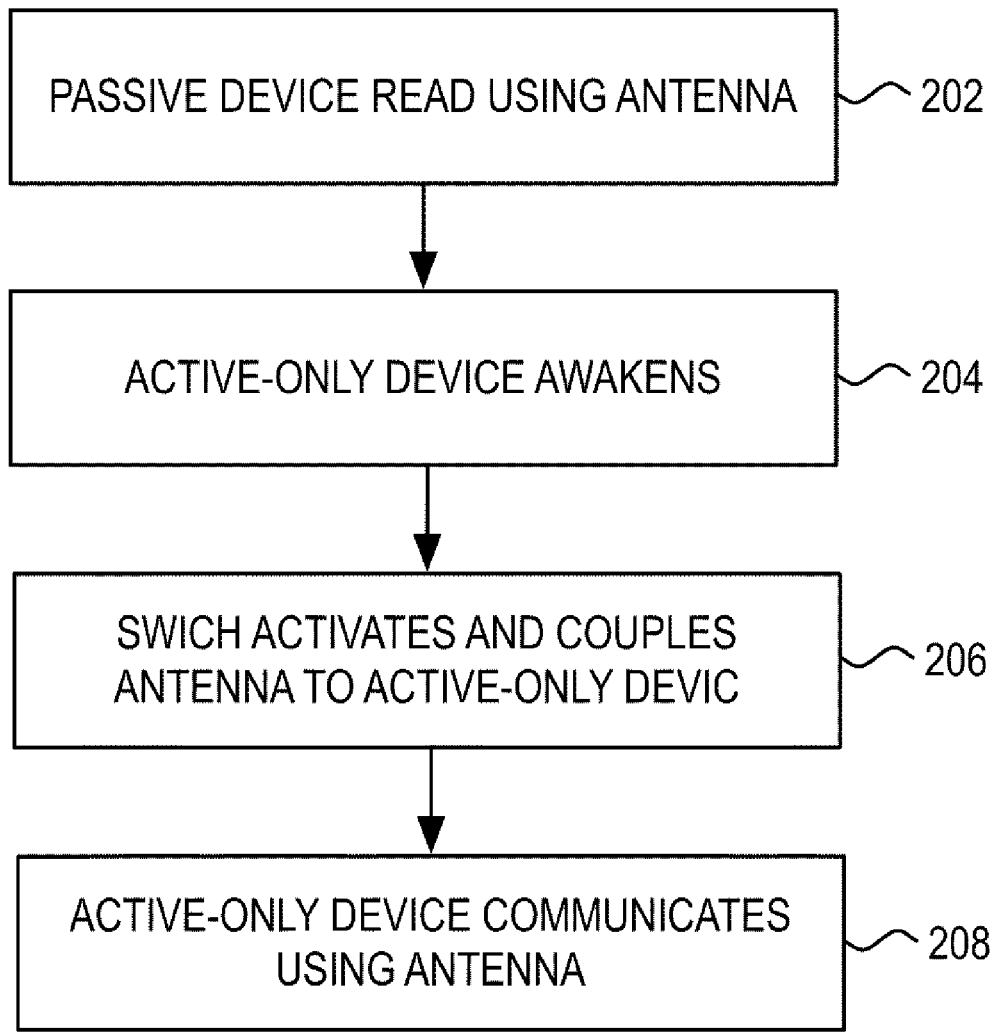
FIG. 2 illustrates a flowchart of a process of selective coupling of an antenna to either an active or a passive component.

FIG. 2 illustrates one example of a method by which a single antenna can be used by both passive component 110 and active component 120. As illustrated, the process begins at step 202 where passive component 110 is read using antenna 140, which is coupled to passive component 110. In one example, this read process can represent the reading of a passive RFID tag when the device is in a low-power "sleep" mode. Next, at step 204, active component 120 awakens. An example of such an awakening mechanism is described in co-pending application Ser. No. 11/956,982, entitled "System and Method for Enabling Interrupts for RFID Tags," filed Dec. 14, 2007, which incorporated herein by reference in its entirety. In one example, this awakening process can occur when the higher capacity (e.g., data transmission rate, storage capacity, etc.) of active component 120 is needed. At step 206, switch 130 would then couple antenna 140 to active component 120. Active component 120 can then communicate using antenna 140 at step 208. In one example, the function of active component 120 could be to facilitate higher data rate communication after passive component 110 enabled the transfer of configuration information.

In another embodiment, active component 120 is an active device that also has the ability to emulate the function of a passive RFID tag while operating in an active mode. In this embodiment, passive component 110 can provide data to a remote RFID tag reader when switch 130 connects antenna 140 to passive component 110, and active component 120 can provide data to a remote RFID tag reader when switch 130 connects antenna 140 to active component 120. Active component 120 can further provide other active communication means. For example, passive component 110 can be a passive RFID tag utilizing Near Field Communication (NFC) means while active component 120 is capable of emulation of a passive NFC RFID tag and also capable of engaging in peer-to-peer NFC communication. As another example, passive component 110 can be a passive RFID tag utilizing a 2.4 GHz RFID communication means while active component 120 is capable of emulation of a passive 2.4 GHz RFID tag and also capable of engaging in communication using Bluetooth and/or Wi-Fi in the 2.4 GHz frequency band.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A wireless communication method, comprising:
   after configuration information is read from a passive component in a wireless communication device, switching a connection of an antenna from said passive component to an active component, said switching being responsive to a determination that a capacity of said active component is needed; and
   transmitting by said active component to a reader device, wherein communication between said active component and said reader device is enabled by said configuration information that is read from said passive component.

2. The method of claim 1, wherein said passive component is a passive radio frequency identification tag.

3. The method of claim 1, wherein said active component is a Bluetooth module.

4. The method of claim 1, wherein said active component is a Wi-Fi module.

5. The method of claim 1, wherein said active component is a near field communication module.

6. The method of claim 1, wherein said determination is based on whether higher storage capacity is needed.

7. The method of claim 1, wherein said determination is based on whether higher transmission capacity is needed.

8. The method of claim 1, wherein said switching comprises removing a connection between said antenna and said passive component.

9. The method of claim 1, wherein said passive component is coupled to said antenna when said wireless communication device is in a low power sleep mode.

10. A wireless communication device, comprising:
    an antenna;
    an unpowered passive component that is coupled to said antenna, said passive component being read as part of a first phase of an interaction with the wireless communication device, said first phase of said interaction including a passage of facilitating information; and
    a powered active component that is selectively coupled to said antenna during a second phase of said interaction with the wireless communication device, said second phase of said interaction with the wireless communication device being dependent on said passage of facilitating information.

11. The wireless communication device of claim 10, further comprising a switch that selectively couples said antenna to said unpowered passive component or said powered active component.

12. The wireless communication device of claim 10, wherein said unpowered passive component is a passive radio frequency identification tag.

13. The wireless communication device of claim 10, wherein said powered active component is a Bluetooth module.

14. The wireless communication device of claim 10, wherein said powered active component is a Wi-Fi module.

15. The wireless communication device of claim 10, wherein said powered active component is a near field communication module.

16. The wireless communication device of claim 10, wherein said unpowered passive component is coupled to said antenna when said wireless communication device is in a low power sleep mode.

17. The wireless communication device of claim 10, wherein said capacity of said powered active component is storage capacity.

18. The wireless communication device of claim 10, wherein said capacity of said powered active component is transmission capacity.

19. A wireless communication method, comprising:
    transmitting, by a passive component in a wireless communication device, using an antenna, wherein said antenna is coupled to said passive component using a switch element;
    determining whether a capacity of an active component in said wireless communication device is needed;
    switching a connection of said antenna to said active component when it is determined that said capacity of said active component is needed; and
    transmitting, by said active component, using said antenna.

20. The method of claim 19, wherein said passive component is a passive radio frequency identification tag.

* * * * *